Figure 7:
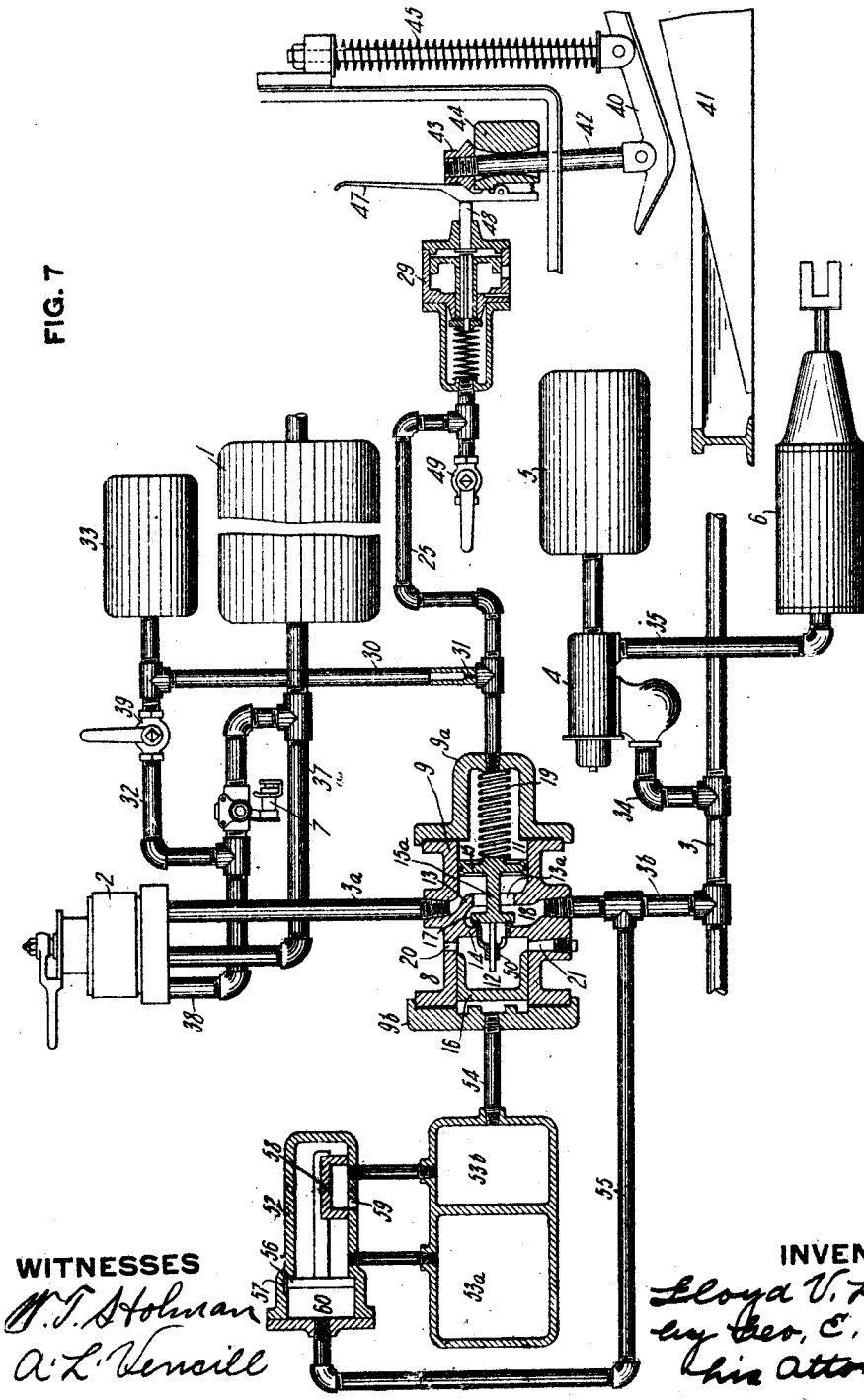

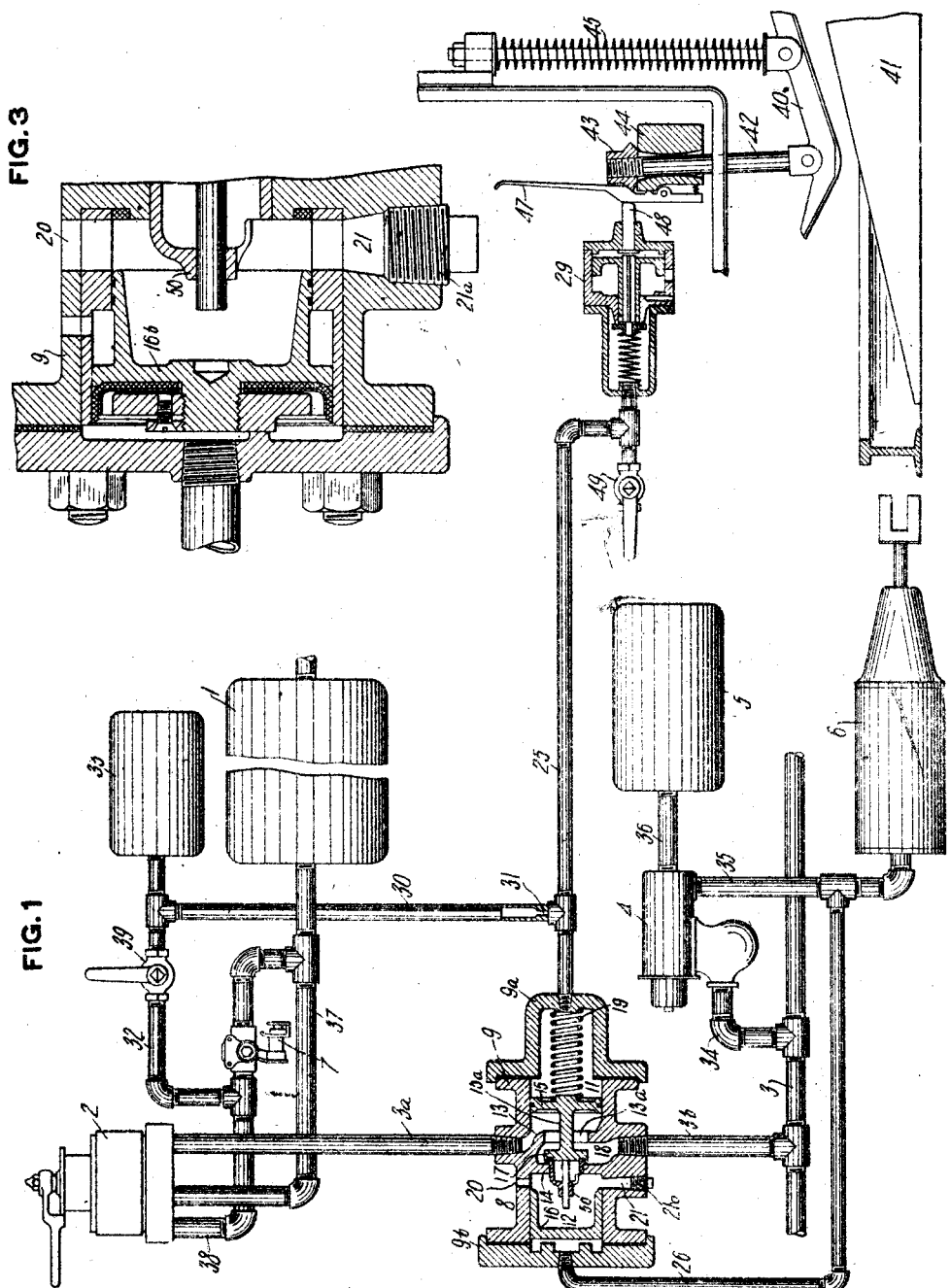

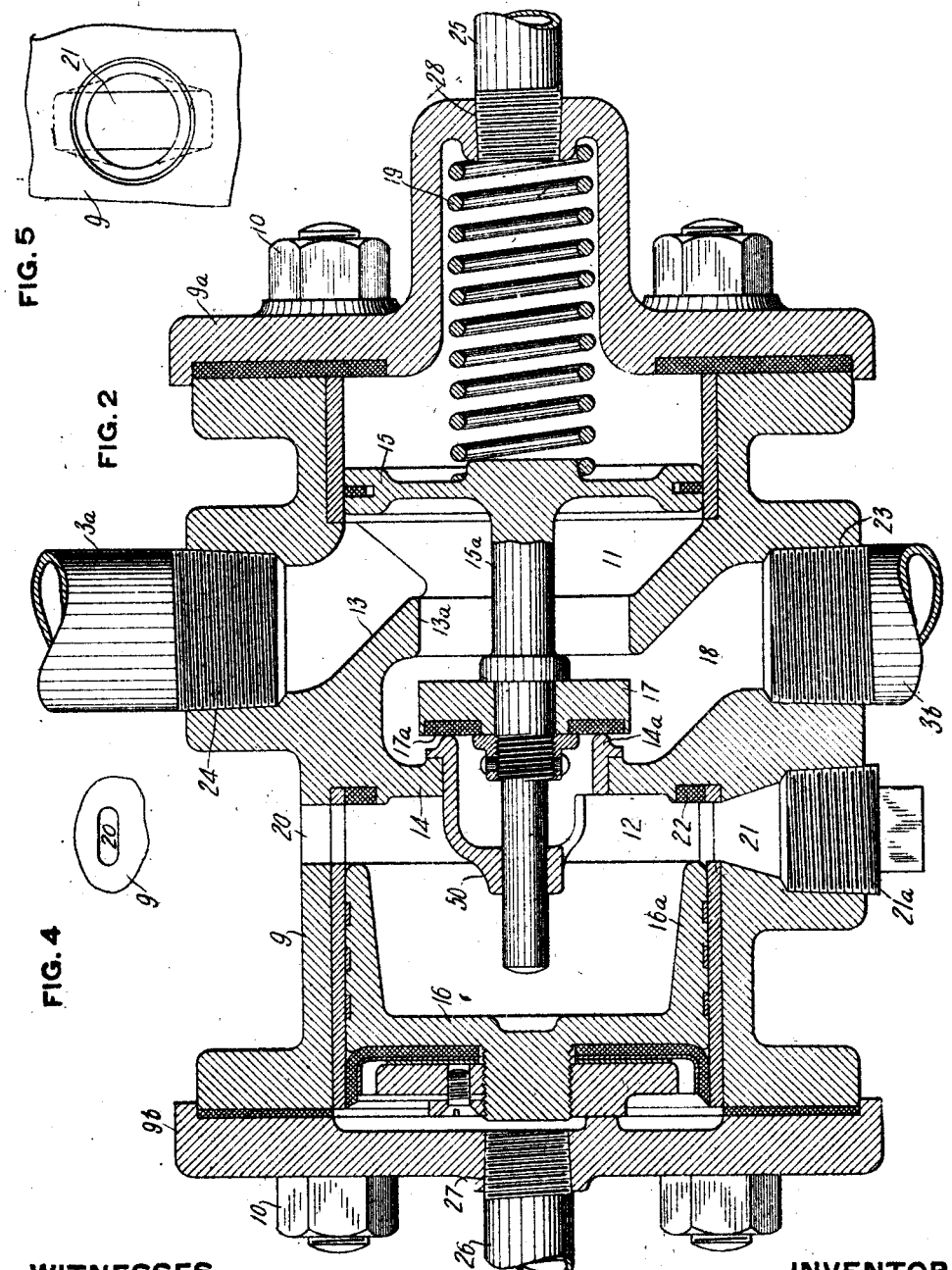

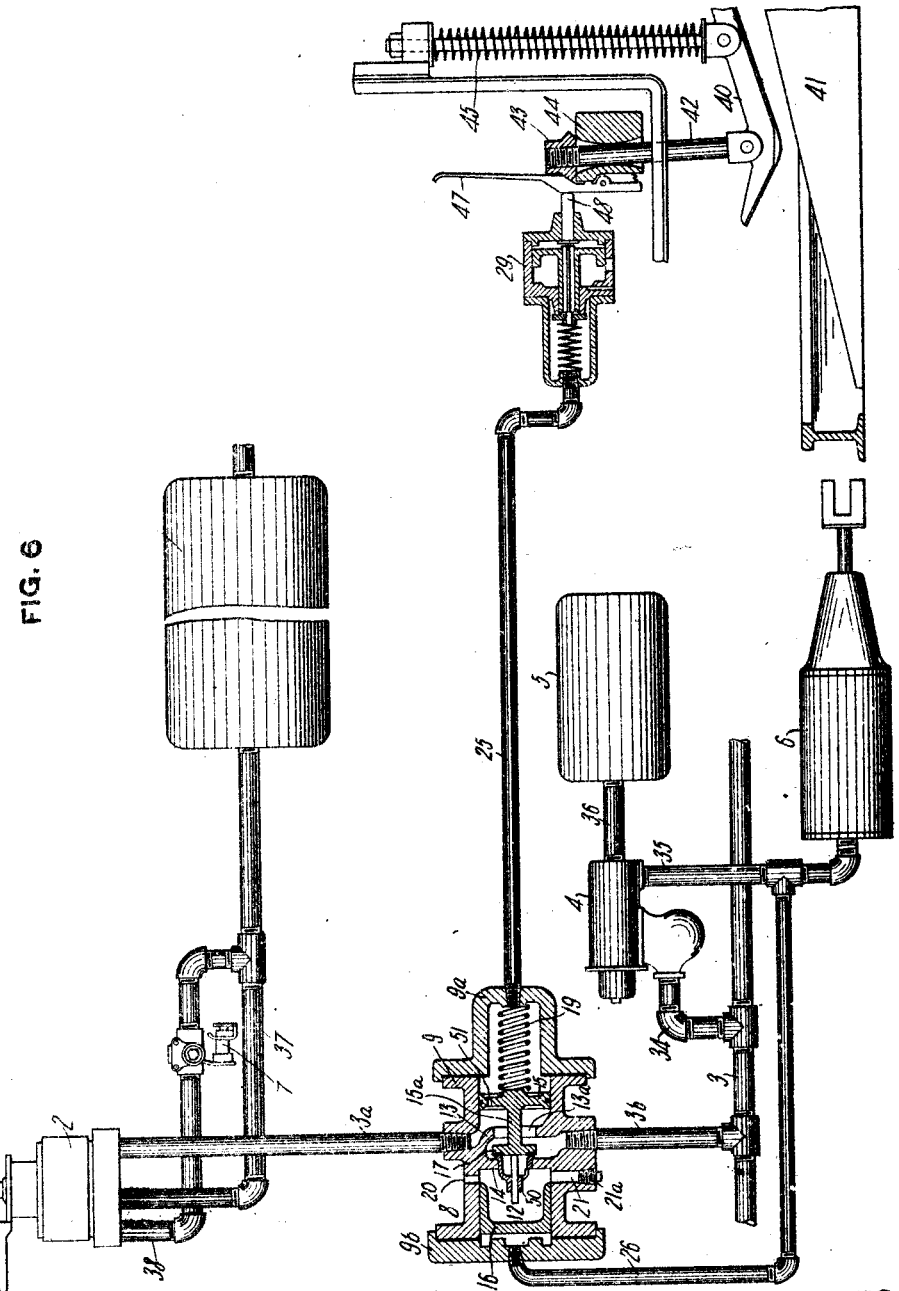

L. V. LEWIS.
APPARATUS FOR THE CONTROL OF FLUID PRESSURE BRAKES.
APPLICATION FILED MAY 8, 1913.

1,192,331.

Patented July 25, 1916
4 SHEETS—SHEET 4.

WITNESSES

INVENTOR

UNITED STATES PATENT OFFICE.

LLOYD V. LEWIS, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

APPARATUS FOR THE CONTROL OF FLUID-PRESSURE BRAKES.

1,192,331.     Specification of Letters Patent.     Patented July 25, 1916.

Application filed May 8, 1913. Serial No. 766,291.

*To all whom it may concern:*

Be it known that I, LLOYD V. LEWIS, a citizen of the United States, residing at Edgewood borough, in the county of Allegheny and State of Pennsylvania, have invented certain new and useful Improvements in Apparatus for the Control of Fluid-Pressure Brakes, of which the following is a specification.

My invention relates to apparatus for the control of fluid pressure brakes for railway vehicles and particularly to apparatus for controlling such brakes automatically, that is, independently of the engineer or driver of the vehicle.

I will describe certain forms of apparatus embodying my invention, and will then point out the novel features thereof in claims.

In the accompanying drawings, Figure 1 is a view showing one form of apparatus for the control of fluid pressure brakes embodying my invention. Fig. 2 is a view showing in cross-section and on an enlarged scale a brake application valve shown in Fig. 1 and embodying my invention. Fig. 3 is a view showing a modification of a portion of the brake application valve shown in Fig. 2. Fig. 4 is a view showing in top plan view a portion of the brake application valve shown in Fig. 2, and Fig. 5 is a similar view showing in bottom plan view a portion of the brake application valve shown in Fig. 2. Figs. 6 and 7 are views showing modifications of the apparatus shown in Fig. 1.

Similar reference characters refer to similar parts in each of the several views.

Referring first to Fig. 1, the reference character 1 designates a reservoir, usually known as the "main reservoir," which is supplied with fluid pressure, usually compressed air, from a suitable compressor (not shown). 3 is a brake pipe to which is connected, by means of a pipe 34, a valve device 4 known usually as a "triple valve." This triple valve is connected by means of a pipe 36 with an auxiliary reservoir 5, and by means of a pipe 35 with a brake cylinder 6. The pressure in the brake pipe 3 is as usual controlled by an engineer's brake valve 2, to which the brake pipe 3 is connected by pipes 3$^a$, 3$^b$, and a brake application valve 8 hereinafter explained. The engineer's brake valve 2 is connected with the reservoir 1 by means of a pipe 37, and also by means of a branch pipe 38 containing a feed valve 7.

The parts of the apparatus which I have thus far mentioned are so well known that no explanation of their structure or operation is necessary herein. It is, of course, understood that the brake pipe 3 is normally connected with the reservoir 1 through the engineer's brake valve 2 in the "running" position and the valve 8, and that a reduction of pressure in this brake pipe causes triple valve 4 to operate to admit fluid-pressure from the auxiliary reservoir 5 to the brake cylinder 6 to produce an application of the brakes.

Referring now to both Figs. 1 and 2, I will explain the brake application valve 8. This valve device comprises an inclosing casing formed of a body portion 9 provided with two caps 9$^a$ and 9$^b$, one at each end. These caps are fixed to the body portion by bolts 10. The section 9 comprises two cylinders 11 and 12, in which are located pistons 15 and 16, respectively. These cylinders are separated by two partitions 13 and 14, which form an intervening chamber 18. Each partition contains a valve port 13$^a$, 14$^a$, one or the other of which ports is closed by a valve 17 according as the valve is in one extreme position of its stroke or the other. This valve 17 is fixed to a rod 15$^a$ which passes through the port 13$^a$ and is fixed to a piston 15. The outer end of rod 15$^a$ is supported in a bracket 50 fixed in partition 14. As here shown, one face of valve 17 is provided with a gasket 17$^a$ which seats against the annular rim of valve port 14$^a$; the valve port 13$^a$ is made of such size that the valve 17 may enter this port bodily, so that the closing of this port is accomplished by the periphery of the valve 17. The purpose of this construction is to permit the valve 17 to be readily withdrawn from the valve body by removing the cap 9$^a$. The piston 15 is biased by a spring 19 to such position that valve 17 seats against the annular rim 14$^a$.

The cylinder 12 is provided near the partition 14 with two ports 20 and 21, which are of comparatively small and large cross-sectional area respectively. Port 21 is provided with screw threads and as here shown is closed by a pipe plug 21ª which may be removed when desired. Port 20 is preferably elongated, as shown in Fig. 4, so that its area is comparatively small and yet so that it is gradually cut off by the rim 16ª when piston 16 moves to the right. Port 21 is preferably rectangular in shape as shown in Fig. 5 so that its area is substantially equal to the area of pipe plug 21ª. The purpose of these ports will appear hereinafter. The piston 16 has an extended rim 16ª which rim, when the piston is in the position shown, does not cover either port 20 or 21, but does cover both ports when the piston moves to the right. When the piston moves to this latter position the end of the rim 16ª seats against a gasket 22 in partition 14, thereby effectively disconnecting chamber 18 from ports 20 and 21 even though valve 17 may not be seated on port 14ª.

The wall of chamber 18 is provided with a hole 23 which is threaded to receive the threaded end of pipe 3ᵇ, and the wall of cylinder 11 is also provided with a threaded hole 24 to receive the threaded end of pipe 3ª. Cap 9ª is provided with a threaded hole 28 to receive the threaded end of a pipe 25, and cap 9ᵇ is provided with a threaded hole 27 adapted to receive the threaded end of a pipe 26. Pipe 26 leads to the brake cylinder 6, and, therefore, the pressure on the left-hand side of piston 16 is the same as that in the brake cylinder. Pipe 25 leads to a valve device 29, which normally closes the end of this pipe, but which valve may at times be opened as hereinafter explained. Pipe 25 is connected with the pipe 38 through the medium of a pipe 30, a cock 39, a pipe 32, and an orifice 31 of restricted area. The cock 39 is normally open, hence, the pipe 25 normally contains fluid under the same pressure as that in the brake pipe 3.

The valve device 29 may be of any type which is normally closed and which when opened will remain open until the pressure in pipe 25 has fallen to a predetermined value, such, for example, as 5 pounds per square inch. This valve device, as here shown, is similar to the valve device 40 shown and described in my co-pending application filed Feb. 13, 1913, Serial No. 748,092, to which reference may be had for a description of this valve device. Any suitable means may be provided for opening the valve device 29 when it is desired that the brakes should be applied; this means, as well as the specific structure of the valve device 29, form no part of my present invention. As here shown, this means is the same as that shown and described in my co-pending application, Serial No. 748,092. Briefly described, it comprises an arm 40 mounted on the vehicle and biased by a spring 45 so that it normally is in position to be raised by an inclined surface of a trip 41 located in the trackway. Connected with the arm 40 is an upwardly extending rod 42, which latter passes freely through a hole in a member 44 and is provided with a head 43 which rests upon the member 44. A latch 47 is pivotally mounted on the member 44 and is provided with an offset portion which may be engaged by the head 43. When the arm 40 is raised by a trip 41, the head 43 engages the offset portion of latch 47 and swings this latch laterally on its pivot so that the latch operates the valve stem 48 to open the valve device 29.

The operation of the valve device 8 and associated apparatus is as follows: Under normal conditions, that is, when the pressure in pipe 25 is the same as that in brake pipe 3, the fluid pressure on each face of piston 15 is the same, hence the spring 19 holds this piston at the extreme left hand position so that valve port 14ª is closed by valve 17. Valve port 13ª is then open, so that pipes 3ª and 3ᵇ are connected, and the brake pipe 3 is, therefore, connected with reservoir 1 through the engineer's valve 2. The fluid pressure brakes may then be controlled by the engineer's valve 2 in the usual manner. When valve device 29 is opened, the consequent reduction of pressure in pipe 25 permits the pressure on the left hand face of piston 15 to overcome the action of spring 19 and move this piston to the right, thereby causing valve 17 to open port 14ª and close port 13ª. The opening of the former port allows fluid from chamber 18 to pass into cylinder 12, and if piston 16 is not at the left hand end of its stroke it is immediately moved there, so that brake pipe 3 is opened to atmosphere through port 20 alone or through both ports 20 and 21, according to whether or not the port 21 is closed by plug 21ª. The closure of port 13ª by valve 17 disconnects pipe 3ª from chamber 18, thereby preventing loss of fluid from the reservoir 1, and also preventing interference by the manipulation of the engineer's brake valve 2.

The cross-sectional area of port 20 is such that when port 21 is closed by plug 21ª, the rate of reduction of pressure in the brake pipe 3 is such as to cause a "service" application of the brakes; and the cross-sectional area of port 21 is such that when this port is open, the rate of reduction of the pressure in brake pipe 3 due to the two ports 20 and 21 is such as to cause an "emergency" application of the brakes. The purpose of plug 21ª is to permit the same valve device 8 to cause an emergency or a service application of the brakes by merely removing or inserting the plug.

It is well understood that reduction of the pressure in the brake pipe 3 below a certain value is a waste of fluid pressure and is undesirable because it results in loss of braking power and loss of time in recharging the brake pipe to release the brakes. When the pressure in the brake cylinder 6 begins to rise, the piston 16 will move to the right until it partially closes the exhaust port 20 or ports 20 and 21; this partial closure will tend to retard its further movement. The reduction of pressure in the brake pipe 3 will then be slower. As the pressure in the brake cylinder 6 continues to rise, piston 16 will be continually moved farther to the right, cutting down the area of the exhaust port or ports, until finally the brake pipe pressure is slightly less than that in the brake cylinder 6, when the piston will entirely close the exhaust port or ports, and further waste of fluid is prevented.

As hereinbefore stated, the valve device 29, when opened, will remain open until the pressure in pipe 25 has been reduced below a predetermined value, such, for example, as 5 pounds per square inch. The area of the orifice 31 is such that while cock 39 is open, the pressure in pipe 25 will not fall below this predetermined value. Hence, in order to release the brakes it is necessary to provide means for reducing the pressure in pipe 25 below this predetermined value. I have here shown two separate means for accomplishing this function, either of which may be employed. One of these means is a cock 49 by means of which the pipe 25 may be opened to atmosphere, thereby quickly reducing the pressure therein below the predetermined value and so allowing the valve device 29 to close; if then the cock 49 is again closed, the pressure in pipe 25 will build up and cause piston 15 to be again moved to the left by spring 19, thereby releasing the brakes. The cock 49 is preferably located at a point on the vehicle which can be reached only from the roadbed, thereby rendering it impossible for a person on the vehicle to employ this cock to release the brakes after an automatic application until the train has been brought to a stop. It is obvious that when valve device 29 is closed, the opening of cock 49 will cause an application of the brakes. The other means which I have here shown for releasing the brakes comprises the cock 39. This cock is preferably located in such position that it can be easily reached by the driver of the vehicle when the driver occupies his usual position. After an application of the brakes in response to an operation of valve device 29, the cock 39 may be closed; then as soon as the pressure in pipe 25 has fallen below the predetermined value for holding valve device 29 open, this valve device will close. Cock 39 may then be again opened, and the pressure in pipe 25 will then build up to such value as to move piston 15 to the left, thereby permitting the brake pipe to be recharged to release the brakes. Cock 39 cannot be employed to prevent a brake application in response to operation of valve device 29, because if this cock is closed prior to the opening of valve device 29, the normal pressure will be maintained in pipe 25 by leakage into this pipe from pipes 3ª and 3ᵇ past piston 15, so that after the opening of valve device 29 the same period of time will elapse before release of the brakes as if this cock were closed at the moment of opening the valve device 29.

It is sometimes desirable to insure that a considerable interval of time should elapse between the time that the cock 39 is closed and the time that the pressure in pipe 25 builds up to such point as to cause the brakes to release; the reason for this is to insure that the brakes should be applied for an interval long enough to bring the vehicle to a standstill or nearly so. In order to enforce this time interval, I preferably connect a reservoir 33 with pipe 30. Then when cock 39 is closed after a brake application, a considerable interval of time will elapse before the pressure in pipe 25 will fall below the value at which it holds valve device 29 open, this interval being determined by the time required for the pressure in reservoir 33 to reduce through the restricted orifice 31 from the initial pressure (the pressure in pipe 38) to below the predetermined value for holding valve device 29 open. After valve device 29 has closed, cock 39 may again be opened, after which the brakes will be released as hereinbefore explained.

In some braking systems, a very high pressure, for example, 110 pounds per square inch, is employed in the brake pipe, while a comparatively low pressure, for example, 45 pounds per square inch, is used in the locomotive brake cylinders. With this valve of brake pipe pressure, the pressure in the brake cylinders of the rest of the train equalizes with the brake pipe pressure at about 78 pounds per square inch for service application. Hence, in order to prevent further loss of fluid when the brake pipe pressure falls to 78 pounds, it is necessary to make 45 pounds on the left side of piston 16 balance 78 pounds on the right; this may be accomplished by making the piston differential in form, as shown in Fig. 3, in which the area of the left hand face of piston 16ᵇ is greater than the area of the right hand face. By properly proportioning the areas of the two piston faces, any desired brake pipe pressure may be balanced by any brake cylinder pressure; hence a service application of any desired value may be obtained, from a very light to a full service application.

The form of application shown in Fig. 6 is a modification of that shown in Fig. 1. In Fig. 6, fluid pressure is supplied to pipe 25 from pipe 3ª by means of an orifice 51 in piston 15, the connection between pipe 25 and feed pipe 38 being omitted.

The operation of the apparatus shown in Fig. 6 is as follows: When valve device 29 is opened, the consequent reduction of pressure in pipe 25 permits the pressure on the left-hand face of piston 15 to move this piston to the right, thereby opening port 14ª and causing a brake application as before. Valve device 29 is held in the open position by fluid supplied from pipe 3ª through orifice 51 and pipe 25, and piston 15 is therefor held in the right hand position. The release of the brakes may be accomplished by the driver of the vehicle in the following manner. The driver first moves valve 2 to the emergency position, thereby opening pipe 3ª to atmosphere. The source of supply of fluid for pipe 25 being thus cut off, the pressure in this pipe soon falls to the point at which valve device 29 closes; then the pressure of the fluid on the two sides of piston 15 becomes equalized at a low value, but the piston does not return to the left because of the brake pipe pressure acting on the left hand face of valve 17. The driver then returns valve 2 to the running position thereby permitting the pressure in pipe 3ª to build up, and thereby gradually building up the pressure in pipe 25. The pressures on both sides of valve 15 and on both sides of valve 17 then being equalized, the spring 19 becomes effective to move piston 15 to the left thereby permitting release of the brakes.

In the modification of my invention shown in Fig. 7, the piston 16 instead of being controlled by the pressure in brake cylinder 6, is controlled by the pressure in two reservoirs 53ª and 53ᵇ, the latter of which is connected with the left hand end of cylinder 8 by a pipe 54. The pressures in reservoirs 53ª and 53ᵇ are controlled by a slide valve 58, which is operated by a piston 56 movable in a cylinder 60. The left hand end of cylinder 60 is connected with the brake pipe 3 by a pipe 55 and pipe 3ᵇ.

The operation of the apparatus shown in Fig. 7 is as follows: When valve device 29 is closed and valve 2 is the running position, piston 56 and slide valve 58 occupy the position shown in the drawing, so that reservoir 53ᵇ is open to atmosphere through port 59 and reservoir 53ª is in communication with brake pipe 3 through a by-pass 57 and pipe 55. The pressures on each side of piston 56 are then the same. Hence, the pressure in reservoir 53ª is the same as that in brake pipe 3; this pressure I will assume to be 70 pounds per square inch. When valve device 29 is opened, the consequent reduction of pressure in pipe 25 permits piston 15 to be moved to the right thereby opening brake pipe 3 to atmosphere through port 20 or through ports 20 and 21. The consequent reduction in the brake pipe 3 causes triple valve 4 to cause application of the brakes, and also causes reduction of pressure in cylinder 60 so that the pressure on the right-hand face of piston 56 exceeds that on the left-hand face, and this piston is then moved to the left, thereby disconnecting reservoir 53ᵇ from atmosphere and connecting it with reservoir 53ª. Fluid then flows from reservoir 53ª to reservoir 53ᵇ, until the pressures in these two reservoirs are equal. As the pressure on the right hand face of piston 56 is reduced by the flow of fluid from reservoir 53ª into reservoir 53ᵇ, the pressure on the left hand face of this piston is also reduced by the outflow of fluid from the brake pipe 3, consequently piston 56 remains in its left-hand position. The relative sizes of these reservoirs may be such that this equalization occurs at any desired pressure. When the pressure in reservoir 53ᵇ begins to rise, it causes piston 16 to move to the right, partially closing port 20 or ports 20 and 21, and this partial closure retards further movement of the piston 16 because it causes increase of pressure in cylinder 12; the reduction of pressure in brake pipe 3 then takes place more slowly. As the pressure in reservoir 53ᵇ continues to rise, piston 16 is moved gradually to the right, thereby gradually reducing the area of port 20 or ports 20 and 21, until finally when the pressure in brake pipe 3 becomes slightly less than the pressure in chamber 53ᵇ, these ports are closed completely, and further waste of fluid from brake pipe 3 is prevented. The brakes may then be released by means of cock 49 or cock 39, as hereinbefore explained in connection with Fig. 1. In either case, the return of piston 15 to its initial position allows the pressure in brake pipe 3 to build up to its initial value, and this building up causes piston 56 to move back to its initial position, thereby again connecting reservoir 53ᵇ with atmosphere. The pressure in reservoir 53ª then builds up to its initial value, and the parts of the apparatus are again in their initial positions and conditions.

Although I have herein shown and described only certain forms and arrangements of apparatus embodying my invention, it is understood that various changes and modifications may be made therein within the scope of the appended claims without departing from the spirit and scope of my invention.

Having thus described my invention, what I claim is:

1. In fluid pressure braking apparatus for railway vehicles, a brake pipe and a brake cylinder, means for permitting reduction of the pressure in the brake pipe for causing the admission of fluid pressure to the brake cylinder, and means controlled by the relation between brake pipe pressure and the pressure in the brake cylinder for limiting the reduction of pressure in the brake pipe.

2. In fluid pressure braking apparatus for railway vehicles, a brake pipe and a brake cylinder, a valve cylinder, an exhaust port therein, a piston movable in the valve cylinder and adapted to cover or uncover the port, means for exposing one side of said piston to brake pipe pressure to tend to move the piston to uncover the port, and means for exposing the other side of the piston to the pressure in the brake cylinder.

3. In fluid pressure braking apparatus for railway vehicles, a brake pipe and a brake cylinder, a valve device comprising a valve cylinder, a port in the latter cylinder, a piston adapted to move in the latter cylinder and to uncover or cover the port, means for connecting the brake pipe with such end of the valve cylinder that the pressure in said pipe tends to move the piston to uncover the port so that the brake pipe pressure is reduced through said port, and means for connecting the brake cylinder with the valve cylinder on the other side of the piston so that when the brake cylinder pressure reaches a predetermined value the piston is moved to close the port thereby stopping the reduction of pressure in the brake pipe.

4. In fluid pressure braking apparatus for railway vehicles, a brake pipe and a brake cylinder, a valve cylinder and a piston movable therein, an exhaust port controlled by the piston for permitting reduction of pressure in the brake pipe, means for at times exposing such face of said piston to brake pipe pressure as to move the piston to open the said port, and means for exposing the other face of the piston to the pressure in the brake cylinder.

5. In fluid pressure braking apparatus for railway vehicles, a brake pipe and a brake cylinder, a valve cylinder and a piston movable therein the two sides of said piston being of different areas, a port controlled by said piston for permitting reduction of pressure in the brake pipe, means for subjecting such face of said piston to brake pipe pressure as to move the piston to open the port, and means for subjecting the other face of the piston to the pressure in the brake cylinder.

6. Fluid pressure braking apparatus for vehicles, comprising a pipe normally supplied with fluid pressure, means controlled by a reduction of pressure in said pipe for causing an application of the brakes, a valve device for opening said pipe, said valve device when opened being held open by the fluid pressure in the pipe until the fluid pressure in the pipe is reduced to a predetermined value, a reservoir connected with said pipe through a restricted orifice, a source of fluid pressure, and means for connecting said source with and disconnecting it from the reservoir.

7. Fluid pressure braking apparatus for vehicles, comprising a pipe normally supplied with fluid pressure, means controlled by a reduction of pressure in said pipe for causing an application of the brakes, a valve device for opening said pipe, said valve device when opened being held open by the fluid pressure in the pipe until the fluid pressure in the pipe is reduced to a predetermined value, a source of fluid pressure, means for connecting said source with and disconnecting it from the said pipe, and an orifice of restricted area interposed between the source and the pipe.

8. Fluid pressure braking apparatus for vehicles, comprising a pipe normally supplied with fluid pressure, a brake application valve responsive to a reduction of pressure in said pipe to cause a brake application, a valve device for opening said pipe which valve device when opened is held open by the fluid pressure in the pipe until the fluid pressure in the pipe is reduced to a predetermined value, means for opening said valve device, a reservoir connected with the pipe through a restricted orifice, a source of fluid pressure, and a cock for connecting said source with and disconnecting it from the reservoir.

9. In fluid pressure braking apparatus for railway vehicles, a brake pipe, means for permitting reduction of the pressure in the brake pipe, a reservoir, means controlled by reduction of pressure in the brake pipe for increasing the pressure in said reservoir, and means controlled by the relation between the brake pipe pressure and the pressure in said reservoir for limiting the reduction of pressure in the brake pipe.

10. In fluid pressure braking apparatus for railways, a brake pipe, means for reducing the pressure in the brake pipe, two reservoirs, means controlled by pressure in the brake pipe for connecting one of said reservoirs with the brake pipe and the other with atmosphere, said last-mentioned means being responsive to reduction of pressure in the brake pipe to disconnect the first reservoir from the brake pipe and the second from atmosphere and to connect the two reservoirs together, and means controlled by the relation between the brake pipe pressure and the pressure in the second reservoir for limiting the reduction of pressure in the brake pipe.

11. In fluid pressure braking apparatus for railways, a brake pipe, means for reducing the pressure in the brake pipe, two reservoirs, a valve device adapted when in one position to connect one reservoir with the brake pipe and the other with atmosphere, and when in another position to disconnect the first reservoir from the brake pipe and the second from atmosphere and connect the two reservoirs together; a cylinder connected with the brake pipe, a piston in the cylinder and operatively connected with the said valve device, said piston when subjected to the normal brake pipe pressure being held in such position that the valve device occupies its first-mentioned position, and said piston being responsive to reduction of pressure to move to such position that the valve device occupies the second-mentioned position, and means controlled by the relation between the brake pipe pressure and the pressure in the second reservoir for limiting the reduction of pressure in the brake pipe.

12. Fluid pressure braking apparatus for railway vehicles, comprising a brake pipe, a valve cylinder and exhaust port therein, a piston movable in the valve cylinder and adapted to cover or uncover the port, means for exposing one side of said piston to brake pipe pressure to tend to move the piston to such position that it uncovers the port, a reservoir to the pressure in which the other side of the piston is exposed, and means controlled by reduction of pressure in the brake pipe for increasing the pressure in said reservoir.

13. Fluid pressure braking apparatus for railway vehicles, comprising a brake pipe, a valve cylinder and a piston movable therein, an exhaust port controlled by the piston for permitting reduction of pressure in the brake pipe, means for at times exposing one face of said piston to brake pipe pressure to move the piston to such position that it opens said port, a reservoir to the pressure in which the other side of said piston is exposed, and means controlled by reduction of pressure in the brake pipe for raising the pressure in said reservoir whereby the said piston is moved to such position that it covers the port.

In testimony whereof I affix my signature in presence of two witnesses.

LLOYD V. LEWIS.

Witnesses:
BERTHA R. CUNNINGHAM,
A. HERMAN WEGNER.